United States Patent
Siepker et al.

(10) Patent No.: US 6,256,568 B1
(45) Date of Patent: Jul. 3, 2001

(54) MOTOR VEHICLE HAVING AN ELECTRONICALLY CONTROLLED AUTOMATIC TRANSMISSION AND A POWER PARKING BRAKE

(75) Inventors: Achim Siepker, Groebenzell; Rudolf Ehrmaier, Munich; Josef Neuner, Raubling, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/353,444

(22) Filed: Jul. 14, 1999

(30) Foreign Application Priority Data

Jul. 15, 1998 (DE) .............................. 198 31 733

(51) Int. Cl.$^7$ .......................... G06F 17/00; G06F 19/00; G06F 7/00
(52) U.S. Cl. .............................. 701/62; 701/51; 701/63; 701/76; 303/9.63; 303/122.03
(58) Field of Search ................ 701/29, 51, 52, 701/58, 62, 63, 76, 97; 180/271; 303/9.63, 122.03

(56) References Cited

U.S. PATENT DOCUMENTS

| 3,557,913 | * | 1/1971 | Russler | 188/106 F |
| 4,120,383 | * | 10/1978 | Kawamoto | 188/31 |
| 4,281,736 | | 8/1981 | Lizzio | 180/271 |
| 4,369,867 | * | 1/1983 | Lemieux | 192/219.5 |
| 4,768,610 | | 9/1988 | Pagel et al. | 180/271 |
| 5,415,467 | | 5/1995 | Utz et al. | 303/89 |

* cited by examiner

Primary Examiner—William A. Cuchlinski, Jr.
Assistant Examiner—Gertrude Arthur
(74) Attorney, Agent, or Firm—Crowell & Moring, L.L.P.

(57) ABSTRACT

A motor vehicle having an electronically controlled automatic transmission, which comprises a parking position, and a power parking brake. The parking position and the power parking brake are operable independently of one another. A redundant system is provided in that a device checks the parking position as well as the power parking brake with respect to its optional functioning and, in the event of an operating failure of one system, operates the respective other system to take over the function of the failed system.

13 Claims, 1 Drawing Sheet

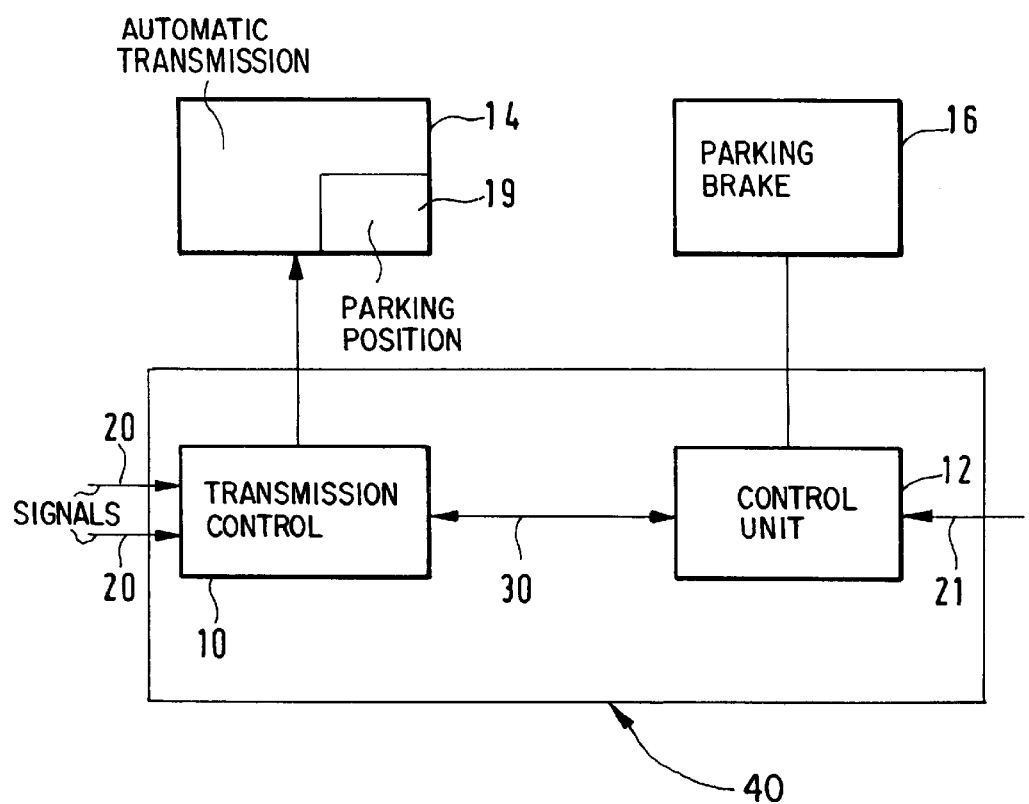

MOTOR VEHICLE HAVING AN ELECTRONICALLY CONTROLLED AUTOMATIC TRANSMISSION AND A POWER PARKING BRAKE

BACKGROUND AND SUMMARY OF THE INVENTION

This application claims the priority of German Application No. 198 31 733.6, filed Jul. 15, 1998, the disclosure of which is expressly incorporated by reference herein.

The invention relates to a motor vehicle having an electronically controlled automatic transmission, which comprises a parking position, and a power parking brake.

From German Patent Document DE 39 29 286 A1, an automatic transmission for motor vehicles is known, in the case of which the individual driving positions, such as P, R, N and D, are engaged in an electronically controlled manner. In this case, an operating element for selecting the individual driving positions is no longer mechanically connected with the transmission, but rather acts only as an electric switching element for selecting the desired driving position. When the operating element is operated, electric contacts are closed. The closed contacts generate switching pulses which are processed by an electronic control unit and are converted to corresponding commands issued to the control elements for the driving position selection and for the shift control. If driving position P (parking position) is selected by means of the operating element, control elements in the form of a locking device are activated in order to set a parking position.

From German Patent Document DE 196 25 019, an electronically controlled automatic transmission is known which automatically sets a parking position as a function of certain operating conditions, for example, when the driving speed of the motor vehicle is equal to zero and the ignition circuit was opened by means of the ignition key. Here also, a locking device in the form of a solenoid acting as an actuator is used.

From U.S. Patent Document U.S. Pat. No. 4,892,014, an electric control for an automatic transmission is known. Here, a control unit automatically activates a power parking brake if the parking position had previously been engaged. The parking brake will then automatically be released again if a number of conditions have been met.

In the case of these known electronically controlled automatic transmissions, a problem may exist if either the parking position or the power parking brake becomes inoperable or fails.

Therefore, it is an object of the invention to provide a motor vehicle with an electronically controlled automatic transmission and a power parking brake wherein the function of the parking position or of the power parking brake can also be carried out when the corresponding system fails.

This object is achieved by a motor vehicle having an electronically controlled transmission system with a parking position function and a power parking brake system. Both systems are checked by a checking device and, in the event an operational failure of one system is detected, the function of this system is taken over by the other system. In particular, the transmission may be controlled by an electric transmission control and the power braking brake may be controlled by a control unit. Both control units may be part of the checking device and therefore connected to each other.

The object is also achieved by a method comprising the checking of one of the parking position function of the transmission system and the power parking brake system and, in the event of failure of one system, operating the respective other system to take over the function of the failed system.

Advantageous further developments of the invention are described herein.

According to the invention, both the parking position as well as the power parking brake represent systems which are redundant with respect to one another. In the event of a failure of one system, its function can be taken over by the respective other system. As a result, the motor vehicle is in every case secured against rolling-away. In addition, in this manner, the entire functionality range which is provided by these two systems can continue to be ensured in the normal operation. If one system fails, the respective other system takes over its function. The driver does not have to think about whether he has to secure the vehicle by means of the parking position or the power parking brake.

Other objects, advantages and novel features of the present invention will become apparent from the following detailed description of the invention when considered in conjunction with the accompanying drawings.

BRIEF DESCRIPTION OF THE DRAWING

The single drawing is a schematic block diagram illustrating a transmission control and a control unit of the power parking brake connected with one another according to the invention.

DETAILED DESCRIPTION OF THE DRAWING

According to the single FIGURE, a transmission control 10 is provided in a vehicle (not shown). The transmission control 10 controls an automatic transmission 14 in accordance with defined input signals 20 as well as a defined transmission algorithm, which is stored in the transmission control 10. The automatic transmission 14 comprises a parking position system 19 with a function which is known per se. In the present case, an automated parking position (Auto-P) is provided. The automated parking position is activated in the normal operation if, on the one hand, the vehicle speed v is essentially zero and, on the other hand, either the key has been pulled out, the engine is switched off, the ignition is switched off, the gear selector lever (not shown) is in position D or R or the gear selector lever is in position N even after a time $\Delta t$.

In parallel, a power parking brake 16 is provided which is controlled by a control unit 12. The power parking brake 16 permits a comfort operation or automatic operation, in which it is automatically released during the start-up drive of the vehicle and is then automatically applied again when the vehicle is stopped (v=0).

By the operation of a separate, not illustrated key button, the power parking brake can be manually released and simultaneously be switched over to a manual operation.

The transmission control 10 and the control unit 12 are connected with one another by way of a line 30. The two systems 10, 12 communicate with one another by means of this line 30. Each system continuously checks its own operability.

As an alternative, each system may also check the operability of the respective other system. Together, individually or independently, the transmission control and control unit function as a checking device 40.

If an operating disturbance occurs in the case of the parking position 19 or the power parking brake 16, this occurrence is transmitted to the transmission control 10 or to the control unit 12 respectively. The respective other unit also recognizes the operating disturbance and then activates its own system in a defined manner in accordance with the intended control the other system. The definition can be stored in each control.

In other words, the power parking brake 16 will be activated if the automated parking position 19 had to be operated, but this automated parking position 19 is unable to function. On the other hand, the automatic parking position 19 will start to operate if the power parking brake 16 had to be activated but is malfunctioning. Thus, in the event of a failure, one system takes over the function of the respective other system so that a redundancy exists.

The above-mentioned invention ensures vehicle safety in a simple manner at reasonable cost and provides a redundant system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   an electronically controlled automatic transmission system with a parking position function;
   a power parking brake system, the parking position function and the power parking brake system being operable independently of one another; and
   a checking device coupled to the automatic transmission system and the power parking brake system, wherein the device checks the functioning of both systems and, in the event of an operating failure of one system, operates the respective other system to take over the function of the failed system.

2. The motor vehicle according to claim 1, wherein the checking device is formed of two-parts, one part being integrated in the automatic transmission and the other part in the power parking brake.

3. The motor vehicle according to claim 1, wherein the parking position function is an automated parking position.

4. The motor vehicle according to claim 1, wherein the checking device comprises an electronic transmission control for operating the automatic transmission system and a control unit for operating the power parking brake system, said electronic transmission control and said control unit both coupling with one another and constantly exchanging information concerning the respective operating status and optimal functioning of the respective system.

5. The motor vehicle according to claim 4, wherein both the electronic transmission control and the control unit check their own operability.

6. The motor vehicle according to claim 4, wherein the electronic transmission control and the control unit check the operability of the respective other system.

7. A motor vehicle, comprising:
   an electronically controlled automatic transmission with a parking position function;
   an electronic transmission control coupled to the automatic transmission and being able to activate the parking position function;
   a power parking brake;
   a control unit coupled to the power parking brake and being able to activate the power parking brake;
   a communication exchange line coupled between the electronic transmission control and the control unit, said exchange line communicating the functioning of the parking position function as well as the functioning of the power parking brake and, in the event of an operating failure of one, causes the respective other to operate.

8. The motor vehicle according to claim 7, wherein the parking position function is an automated parking position.

9. A method for controlling an electronically controlled automatic transmission with a parking position function and a power parking brake of a motor vehicle, the parking position function and the power parking brake being operable independently of one another, the method comprising the acts of:
   checking the functioning of both of the parking position function and the power parking brake; and
   exchanging information concerning the result of said checking step between a first control unit for said parking position function and a second control unit for said parking brake function;
   operating the parking position function to take over the function of the power parking brake in the event of an operation failure of the power parking brake; and
   operating the power parking brake to take over the parking position function in the event of an operation failure of the parking position function.

10. A method for controlling an automatic transmission with a parking position function which is electronically controlled by a transmission control and a power parking brake which is controlled by a control unit, the transmission control and the control unit being coupled with one another and the parking position and the power parking brake being operable independently of one another, the method comprising the acts of:
    exchanging information between the control unit and the transmission control concerning the respective operation status of the power parking brake and parking position function;
    operating the parking position function to take over the function of the power parking brake in the event of an operation failure of the power parking brake; and
    operating the power parking brake to take over the parking position function in the event of an operation failure of the parking position function.

11. The method according to claim 10, further comprising the acts of:
    checking the operability of the parking position function with the electronic transmission control; and
    checking the operability of the power parking brake with the control unit.

12. The method according to claim 10, further comprising the acts of:
    checking the operability of the power parking brake with the electronic transmission control; and
    checking the operability of the parking position function with the control unit.

13. A system for controlling an electronically controlled automatic transmission with a parking position function and a power parking brake of a motor vehicle, the parking position function and the power parking brake being operable independently of one another, comprising:
    means for checking the functioning of one of the parking position function and the power parking brake; and
    means for operating the parking position function in the event of an operation failure of the power parking brake to take over the function of the power parking brake; and means for operating the power parking brake in the event of an operation failure of the parking position function to take over the parking position function.

* * * * *